United States Patent Office 3,513,561
Patented May 26, 1970

3,513,561
PROCESS FOR DRYING AND PURIFYING POST-CHLORINATED POLYVINYL CHLORIDE
Gunther Meyer, Oberlar, Heinrich Thielking, Troisdorf, and Meinhard Springorum, Offenbach am Main, Germany, assignors to Dynamit Nobel A.G., Patent Abteilung, Troisdorf (Bez. Cologne), Germany, a corporation of Germany
No Drawing. Filed July 31, 1967, Ser. No. 657,012
Claims priority, application Germany, Aug. 19, 1966, D 50,885
Int. Cl. F26b 3/08
U.S. Cl. 34—10       5 Claims

ABSTRACT OF THE DISCLOSURE

Polyvinyl chloride that has been post-chlorinated in the presence of swelling agents is dried and purified in a turbulent air suspension.

---

Post-chlorinated polyvinyl chloride is a well known material. There have been proposed various techniques of post-chlorinating vinyl chloride polymers including the technique of swelling the polymer in an aqueous phase and chlorinating such in the swollen condition. It will be apparent that for most purposes it is necessary to remove the swelling agent and possibly byproducts or impurities from the post-chlorinated product. Particularly such swelling agents as chlorinated hydrocarbons, exemplified by methylene chloride and chloroform, must be removed.

It is known in the art to purify such post-chlorinated polyvinyl chlorides by evaporation in rotary dryers, vacuum dryers, conveyor dryers or multistage dryers. These processes, however, are slow and expensive, because the substances contained in the polymers in the swollen state are very slowly removed therefrom. It is true that moisture as well as impurities and swelling agents adhering superficially to polymer particles can be removed relatively quickly by these drying methods, but disproportionally long and uneconomical drying periods are necessary for the achievement of complete drying. At the same time, it is in the prior art to use alkalies to neutralize hydrochloric acid adhering to or contained in the granular polymeric material following purification by steam distillation.

More suitable techniques are solvent extraction procedures using solvents which do not dissolve the polymer but do dissolve the adjuvants. But these processes, too, although they can be performed in a short period of time, have the disadvantage of being very expensive, because it is necessary to purify the contaminated solvents. The drying process that follows such solvent extraction is also expensive, since air drying processes cannot be used, particularly in the case of combustible solvents, because of the danger of explosion.

It is therefore an object of this invention to provide a novel process for the purification and drying of vinyl chloride polymers which have been post-chlorinated with the aid of swelling agents.

Other and additional objects of this invention will become apparent from a consideration of this entire specification including the claims hereof.

In accord with and fulfilling these objects, one aspect of this invention resides in a process for purifying and drying vinyl chloride polymers which have been post-chlorinated with the aid of a swelling agent in aqueous phase by subjecting said post-chlorinated vinyl chloride polymer in granular form to air drying in a turbulent (fluid) bed. Where desired, such fluid bed drying and purifying may be preceded by a preliminary drying in one or more of the conventional prior art drying processes.

The turbulent air suspension process is best performed on a programmed temperature basis. For example, during the first stage moisture and impurities adhering to the granular polymer are removed, using air temperatures of about 150 to 165° C. in the beginning which, because of the high heat of evaporation, causes the substance temperature to be from about 50 to 65° C. Then the temperature of the air supplied is reduced step by step, so that the above-named average substance temperature is maintained until the purifying process is ended.

The first stage of this process, in which moisture and impurities adhering externally to the polymer particles are removed in a relatively brief time, can be performed either by a turbulent air suspension process or in a drying apparatus of the prior art.

In the procedure according to the invention the following advantages surprisingly result:

(1) The expense of treating the product with organic solvents such as acetone, aliphatic alcohols or the like is unnecessary. This also eliminates the cost of the solvents and their recovery.

(2) By means of the turbulent air suspension process an end-product is obtained that is free of hydrochloric acid. It is not necessary to neutralize the material prior to the final purification by the turbulent-air suspension method, or to reduce the hydrochloric acid content of the product by washing with water or the like.

(3) The tower used in the turbulent air suspension process can be made in a corrosion-resistant design without great expense, whereas the corrosion-resistant construction of complex drying units involves high cost.

(4) The turbulent air suspension process makes possible a substantial reduction of the drying and purifying time.

(5) The process of the invention permits a substantially more intensive purification of post-chlorinated polyvinyl chloride than in processes of the prior art, while a considerable improvement in the thermal stability of the product is achieved thereby.

We have succeeded in this manner in transforming into a product of high thermal stability post-chlorinated polyvinyl chloride which had been manufactured in suspension by means of swelling agents and which, as a result of the post-chlorination process, was still admixed with higher-boiling chlorinated hydrocarbons, doing so in a relatively short time, namely 16 hours, for example, instead of the previous 48 to 80 hours required for the same quantity of the substance.

The following example is illustrative of the practice of this invention without being limiting on the scope thereof.

EXAMPLE 1

172.5 kg. of post-chlorinated polyvinyl chloride still containing hydrochloric acid and having a moisture content of 30 to 35% was subjected to the following drying processes:

(a) Rotary dryer at 60° C.
(b) Circulating air drying oven at 60° C.
(c) Vacuum tumble-dryer at 60° C.
(d) Turbulent air suspension tower at 60–65° C.

The individual data were as follows:

Tower height above filter plate—350 cm.
Tower diameter in lower section of 125 cm.—62.5 cm.
Tower diameter in upper section of 210 cm.—85 cm.
Air velocity—450 cu.m./h. (at normal temp. and pressure)
Air input temperature during drying phase—160° C.
Air input temperature during purifying phase—75° C.

Grain size distribution—75 to 400μ with a maximum between—100 to 150μ
Bulk weight—400 g./l.
Pressure loss in filter plate—approx. 400 mm. water column The thermal stability of the material was tested by an oven test (at 190° C.) on a sheet made by rolling at 190° C. We measured the time of stay of the test specimen in minutes up to the point at which discoloration or decomposition phenomena occur.

| Necessary time of stay in drying unit: | Oven test, min. at 190° C. |
|---|---|
| (a) After 3 passes through dryer | 65 |
| (b) After 80 hours | 75 |
| (c) After 48 hours | 90 |
| (d) After 16 hours | 150–180 |

Furthermore, the centrifuged product used in (a) was additionally extracted with methanol and then dried in a circulating air drying oven for 24 hours; the oven test result was 130 minutes at 190° C.

The subject invention is applicable to post-chlorinated vinyl chloride homo- and copolymers. The comonomers which may be used with vinyl chloride are exemplified by: ethylene, propylene, vinyl-acetate, vinylidene chloride. The swelling agents used may be exemplified by: chloroform, methylene-chloride, carbon-tetrachloride.

Suitable air temperatures used in the drying operation are about 50 to 180° C. The vinyl chloride polymer granules may suitably have a size of about 50 to 500μ preferably about 75 to 250μ.

What is claimed is:

1. Process for drying and purifying post-chlorinated vinyl chloride polymer which has been post-chlorinated in a swollen condition with a swelling agent; which purification process comprises subjecting said polymer in granular form to turbulent air drying in a fluid type bed sufficient to substantially remove said swelling agent from said swollen polymer.

2. Process as claimed in claim 1 wherein said turbulent air drying is preceded by drying said granules in a relatively fixed bed.

3. Process as claimed in claim 1 wherein said swelling agent is a chlorinated hydrocarbon.

4. Process as claimed in claim 1 wherein said air is at an elevated temperature which temperature decreases with the residue time of said granules in said drying.

5. Process as claimed in claim 4 wherein said air temperature is about 70 to 180° C. during said drying and wherein said granules are maintained at about 50 to 65° C. during substantially all of said drying.

References Cited

UNITED STATES PATENTS

| 3,310,882 | 3/1967 | Barber et al. | 34—10 |
| 3,295,221 | 1/1967 | Joy | 34—10 |
| 3,212,197 | 10/1965 | Crawford | 34—10 |
| 3,280,472 | 10/1966 | Lorenian | 34—10 |
| 3,347,961 | 10/1967 | Russell | 34—10 XR |
| 3,349,499 | 10/1967 | Katano | 34—10 |

FOREIGN PATENTS

| 1,028,062 | 5/1966 | Great Britain. |

KENNETH W. SPRAGUE, Primary Examiner